United States Patent
Song et al.

(10) Patent No.: US 12,249,433 B2
(45) Date of Patent: Mar. 11, 2025

(54) COORDINATED FUELING SYSTEM AND METHOD SATISFYING THOUSAND-SECOND PULSED PLASMA DISCHARGE

(71) Applicant: HEFEI INSTITUTES OF PHYSICAL SCIENCE, CHINESE ACADEMY OF SCIENCES, Hefei (CN)

(72) Inventors: Yuntao Song, Hefei (CN); Jiansheng Hu, Hefei (CN); Guizhong Zuo, Hefei (CN); Bin Cao, Hefei (CN); Jinhua Wu, Hefei (CN); Jilei Hou, Hefei (CN); Jingsheng Yuan, Hefei (CN); Yue Chen, Hefei (CN); Yaowei Yu, Hefei (CN); Ming Huang, Hefei (CN); Xianzu Gong, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 0 days.

(21) Appl. No.: 18/640,934

(22) Filed: Apr. 19, 2024

(65) Prior Publication Data
US 2024/0312645 A1    Sep. 19, 2024

(30) Foreign Application Priority Data

Apr. 23, 2023   (CN) .......................... 202310436716.5

(51) Int. Cl.
*G21B 1/15* (2006.01)
*G21B 1/05* (2006.01)

(52) U.S. Cl.
CPC ................ *G21B 1/15* (2013.01); *G21B 1/057* (2013.01)

(58) Field of Classification Search
CPC ....................................................... G21B 1/15
See application file for complete search history.

(56) References Cited

U.S. PATENT DOCUMENTS

| 2016/0141053 A1 | 5/2016 | Yao |
| 2017/0359886 A1 | 12/2017 | Binderbauer et al. |

(Continued)

FOREIGN PATENT DOCUMENTS

| CN | 1697090 A | 11/2005 |
| CN | 106935275 A | 7/2017 |

(Continued)

OTHER PUBLICATIONS

Yao, Lianghua, et al. "High performance experiments on high pressure supersonic molecular beam injection in the HL-1M tokamak." Nuclear fusion 44.3 (2004): 420. (Year: 2004).*

(Continued)

*Primary Examiner* — Sharon M Davis

(57) ABSTRACT

A coordinated fueling system satisfying thousand-second pulsed plasma discharge, including a gas puffing system, a supersonic molecular beam injection system, an ice pellet injection system, a fusion device, a gas puffing port of a wave antenna, a divertor and a plasma. The gas puffing system, the supersonic molecular beam injection system and the ice pellet injection system are provided at different positions of the fusion device to perform deuterium-tritium plasma discharge in a magnetic confinement fusion device. Through coordination of different moments, positions and fueling methods in plasma establishment and maintenance stages, of the stable thousand-second density control of the fusion device, boundary parameters adjustment of the plasma required for wave coupling and effective control of a heat flux of the divertor can be satisfied. A coordinated fueling method is also provided.

3 Claims, 2 Drawing Sheets

(56) References Cited

U.S. PATENT DOCUMENTS

| | | | | |
|---|---|---|---|---|
| 2019/0198182 | A1* | 6/2019 | Parks | G21B 1/057 |
| 2020/0395133 | A1 | 12/2020 | Sato et al. | |
| 2022/0375630 | A1* | 11/2022 | Chrobak | G21B 1/15 |

FOREIGN PATENT DOCUMENTS

| | | |
|---|---|---|
| CN | 113035378 A | 6/2021 |
| CN | 114388148 A | 4/2022 |
| CN | 115410725 A | 11/2022 |
| JP | 2016223400 A | 12/2016 |

OTHER PUBLICATIONS

Jiafu, Dong, et al. "Research on the penetration characteristics of three refuelling methods on HL-1M." Plasma physics and controlled fusion 44.3 (2002): 371. (Year: 2002).*

Baylor, Larry R., et al. "Pellet injection technology and its applications on ITER." IEEE Transactions on Plasma Science 44.9 (2016): 1489-1495. (Year: 2016).*

Song, Yuntao, et al. "Realization of thousand-second improved confinement plasma with Super I-mode in Tokamak EAST." Science Advances 9.1 (2023): eabq5273. (Year: 2023).*

Xingwei Zheng et al., "Investgation of gas puffing and supersonic molecular beam injection density feedback expriments on EAST", Acta Physica Sinica, Dec. 31, 2013, vol. 62, No. 15, pp. 1-7.

Xingwei Zheng, "The Study of High Plasma Density Experiments on EAST", Chinese doctoral dissertation full text database Engineering Technology II series, Sep. 15, 2016, pp. 28-50.

Xuantong Ding, "Experimental progress and innovation on the HL-2A Tokamak", Physics, Jun. 12, 2010, vol. 39, No. 6, pp. 390-399.

Ming Huang et al., "Puffing Rate Calibration and Application on EAST", Vacuum and Cryogenics, Oct. 31, 2022, vol. 28, No. 6, pp. 688-693.

Jilei Hou et al., "Density compensation and stored energy recovery in resonant magnetic perturbation suppressed edge-localized mode H-mode plasmas using pellet fueling on EAST", Nuclear Fusion, No. 59, Aug. 2, 2019, pp. 1-10.

Jiansheng Hu et al., "Brief review of the interactions between plasma and walls in magnetic controlled fusion devices", Journal of University of Science and Technology of China, Sep. 30, 2020, vol. 50, No. 9, pp. 1193-1217.

Yongzhen Zheng et al., "Prediction and mitigation of disruption on the HL-2A tokamak", Nuclear Fusion and Plasma Physics, Jun. 15, 2009, vol. 29, No. 2, pp. 104-110.

* cited by examiner

COORDINATED FUELING SYSTEM AND METHOD SATISFYING THOUSAND-SECOND PULSED PLASMA DISCHARGE

CROSS-REFERENCE TO RELATED APPLICATIONS

This application claims the benefit of priority from Chinese Patent Application No. 202310436716.5, filed on Apr. 23, 2023. The content of the aforementioned application, including any intervening amendments made thereto, is incorporated herein by reference in its entirety.

TECHNICAL FIELD

This application relates to fusion reactors, and more particularly to a coordinated fueling system and method satisfying thousand-second pulsed plasma discharge.

BACKGROUND

Nuclear fusion energy has been widely recognized as an ideal future energy source due to its outstanding benefits in terms of resource, safety and environmental protection. Tokamak magnetic confinement fusion devices are considered scientifically feasible to achieve the utilization of fusion energy, and have great potential to achieve the commercialization of fusion energy.

For future fusion reactors, the output of fusion energy is proportional to parameters such as plasma density and combustion time. Therefore, obtaining the plasma with large time scale and high density is crucial for the commercial operation of fusion reactors, where the key technical issues include: 1) how to develop an integrated production method of high-density plasma and keep the plasma in a steady state; and 2) how to design a boundary heat flux control strategy compatible with the magnetic confinement fusion devices and the steady-state high-density plasma. The main fueling methods for current and future fusion devices include gas puffing, supersonic molecular beam injection and pellet injection. The gas puffing method uses a pressure regulation tank, a gas puffing pipe, an isolation valve, a piezoelectric valve and a regulator to achieve the gas puffing fueling of the fusion device and the monitoring of the gas flow. The gas puffing can be performed at a high field side, a low field side and a divertor area of the fusion device to satisfy the multi-location plasma fueling and the control of a heat flux of the divertor. Since the response time of the piezoelectric valve is about 2 ms, the time delay caused by low back pressure and long puffing pipeline is generally 20-100 ms, and will be further extended as the size of the device increases. Regarding the supersonic molecular beam injection method, the high-pressure subsonic gas is expanded through a Laval nozzle and injected into the vacuum area to form a supersonic molecular beam with an injection speed between 400 m/s and 1200 m/s. Due to the rapid response of the solenoid valve (about 160 ms) and large injection speed, the time delay is generally short (about 2-20 ms). The supersonic molecular beam injection is an excellent fueling and density control method, whose fueling efficiency is about twice that of the ordinary gas puffing method. However, for the high-performance operation of future fusion reactors, the penetration depth of the supersonic molecular beam injection method is not large enough, limiting its application. The pellet injection method makes fusion fuels such as deuterium and tritium into ice pellets, which are injected into the plasma through gas propulsion or centrifugal acceleration. The pellet injection method has a short response time, and a large injection speed (several kilometers per second). In comparison, the pellet injection method is considered as an ideal core fueling method. However, the pellet feeding will cause a large density disturbance, making it difficult to keeping the plasma density stable when used alone.

For the steady-state thousand-second plasma operation of the fusion device, it is difficult to use a single method to solve the problems including the establishment and steady-state maintenance of high-density plasma and the coordinated control of core and edge fueling. Moreover, the single fueling method also fails to simultaneously satisfy the parameter adjustment of the edge plasma, the improvement of wave coupling efficiency and the coordinated control of the divertor heat flux. Therefore, it is urgently needed to develop a coordinated fueling method suitable for the thousand-second high-performance plasma operation in fusion devices, so as to enable the generation and steady-state maintenance of high-density plasma, and coordinated control of core and edge fueling.

SUMMARY

In order to address the problems in the existing fueling technology for long-pulse high-performance discharge plasma, this application provides a coordinated fueling system and method satisfying discharge of thousand-second pulsed plasma in a superconducting Tokamak, so as to enable the generation and steady-state maintenance of high-density plasma, and coordinated control of core and edge fueling in magnetic confinement fusion devices.

In order to achieve the above object, the following technical solutions are adopted.

In a first aspect, this application provides a coordinated fueling system satisfying thousand-second pulsed plasma discharge, comprising a first gas puffing system, a second gas puffing system, a third gas puffing system, a first supersonic molecular beam injection system, a second supersonic molecular beam injection system, an ice pellet injection system, a fusion device, a gas puffing port of a wave antenna, a divertor and a plasma; wherein a gas flow of each of the first gas puffing system, the second gas puffing system and the third gas puffing system is configured to be adjusted by a piezoelectric valve; the first gas puffing system is provided at a mid-plane of the fusion device; the second gas puffing system is provided near a wave antenna of the fusion device; the third gas puffing system is provided at a target plate of the divertor; each of the first gas puffing system, the second gas puffing system and the third gas puffing system is a means of establishing plasma density, improving boundary plasma parameters, improving wave coupling efficiency and alleviating the heat flux of the divertor; the first supersonic molecular beam injection system and the second supersonic molecular beam injection system are each provided with a Laval nozzle for injection; the first supersonic molecular beam injection system is provided at the mid-plane of the fusion device; the second supersonic molecular beam injection system is provided at the divertor; the first supersonic molecular beam injection system and the second supersonic molecular beam injection system are used to maintain the plasma density and alleviate the heat flux of the divertor; the ice pellet injection system is arranged at the mid-plane of the fusion device, and is configured for preparation and acceleration of ice pellets; the ice pellet injection system is used for core fueling on the plasma to obtain a plasma with a high density; the fusion device is a magnetic confinement fusion device; the diverter is a core component of the fusion device, and is configured for deuterium and tritium plasma discharge in the magnetic confinement fusion device; and the divertor is an area of strong interaction between the plasma and a vessel wall, which bears extremely high thermal load.

Fueling methods satisfying thousand-second pulses of Tokamak fusion devices mainly include a gas puffing method, supersonic molecular beam injection method and pellet injection method. The gas puffing method is a traditional way of fueling with a low speed of gas puffing and a time delay of generally 20-100 ms. The time delay will be further extended as a size of a device increases. Regarding the supersonic molecular beam injection method, a high-pressure subsonic gas is expanded through the Laval nozzle to form a supersonic molecular beam with an injection speed between 400 m/s and 1200 m/s. Due to the large injection speed, the time delay is generally about 2-20 ms. The supersonic molecular beam injection method is an effective fueling method, whose fueling efficiency is about twice that of the ordinary gas puffing method. The pellet injection method makes fusion fuels such as deuterium and tritium into ice pellets, which are injected into the plasma through gas propulsion or centrifugal acceleration. The pellet injection method has a short response time, and a large injection speed (several kilometers per second).

The coordinated fueling indicates coordination of edge and core plasma fueling. The first gas puffing system is configured to realize edge fueling, adjust a density and temperature of the plasma in the scrape-off layer; the second gas puffing system is configured to adjust a density and temperature of the plasma near the wave antenna and improve a coupling efficiency of the low hybrid wave and the ion cyclotron wave. Based on characteristics of high gas injection speed and small disturbance of the supersonic molecular beam injection system, the supersonic molecular beam injection system is configured to inject gas to perform feedback control of the plasma density and satisfy feeding requirements near a pedestal of the plasma; and the ice pellet injection system is configured to satisfy requirements of core fueling within the pedestal of the plasma.

The coordinated fueling is achieved through coordination of different fueling methods at different moments; a first part of gas required for plasma discharge is injected by the first gas puffing system to achieve plasma breakdown and establish a thousand-second plasma density; after the thousand-second plasma density is established, the first supersonic molecular beam injection system is used for fueling to maintain the thousand-second plasma density; and the ice pellet injection system is used for core fueling to establish and maintain a higher plasma density than the thousand-second plasma density.

The coordinated fueling method provided in this application can simultaneously satisfy requirements of the control of the plasma density and the heat flux of the divertor. The control of the plasma density is achieved by using the first gas puffing system, the first supersonic molecular beam injection system and the ice pellet injection system arranged at the mid-plane of the fusion device. The first gas puffing system and the supersonic molecular beam injection system configured to satisfy requirements of control of extremely high heat load of the divertor at different time scales and achieve long-pulsed plasma discharge with controllable density and heat flux.

The present disclosure has the following beneficial effects.

This application combines the benefits of three fueling methods: ordinary gas puffing, supersonic molecular beam injection and pellet injection, and adopts different fueling methods at different moments and positions during the pulsed plasma discharge. The ordinary gas puffing is adopted to establish the plasma, and simultaneously adjust parameters of the scrape-off layer plasma near the wave antenna to improve the wave coupling efficiency. The supersonic molecular beam injection is adopted to perform feedback control on the plasma density. The pellet injection is adopted to perform core fueling for the plasma to satisfy the requirements of high-density plasma operation. The ordinary gas puffing system and the supersonic molecular beam injection system provided at the divertor are adopted to perform feedback control of the heat flux of the divertor. Through the coordination of different fueling methods, the stable thousand-second density control and boundary plasma parameter adjustment of the fusion device and effective control of the heat flux of the divertor can be achieved.

In a second aspect, this application provides a fueling method, which can achieve the high-performance steady-state operation of future fusion reactors through the coordination of different types of fueling methods.

Figure 1:
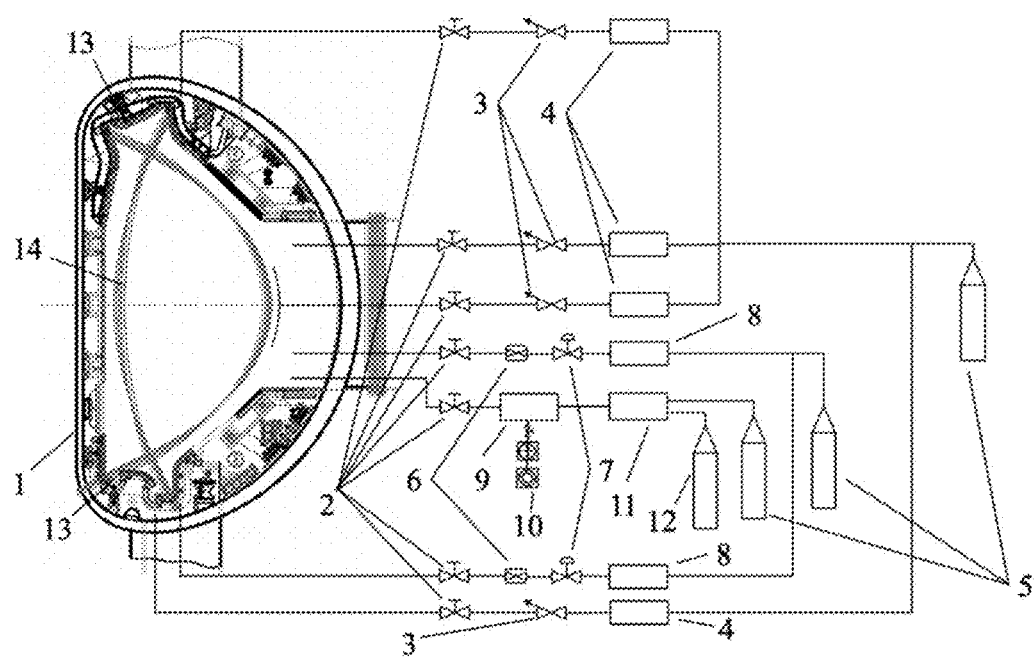
FIG. 1 is a schematic structural diagram of a coordinated fueling system satisfying thousand-second pulsed plasma discharge in accordance with an embodiment of the present disclosure.

In the drawings: 1. fusion device; 2. isolation valve; 3. piezoelectric valve; 4. pressure stabilizing tank; 5. fuel cylinder; 6. Laval nozzle; 7. solenoid valve; 8. gas distribution box; 9. diffusion chamber; 10. vacuum pumping unit; 11. pellet injector; 12. propellant gas cylinder; 13. divertor; 14. plasma; 15. thousand-second plasma density; 16. gas puffing system; 17. supersonic molecular beam injection system; and 18. ice pellet injection system.

DETAILED DESCRIPTION OF EMBODIMENTS

The technical solutions in the embodiments of the present disclosure will be clearly and completely described below with reference to the accompanying drawings of the present disclosure. Obviously, described below are merely some embodiments of the present disclosure, rather than all embodiments. Based on the embodiments provided herein, all other embodiments obtained by those skilled in the art without making creative efforts shall fall within the scope of the present disclosure.

Figure 2:
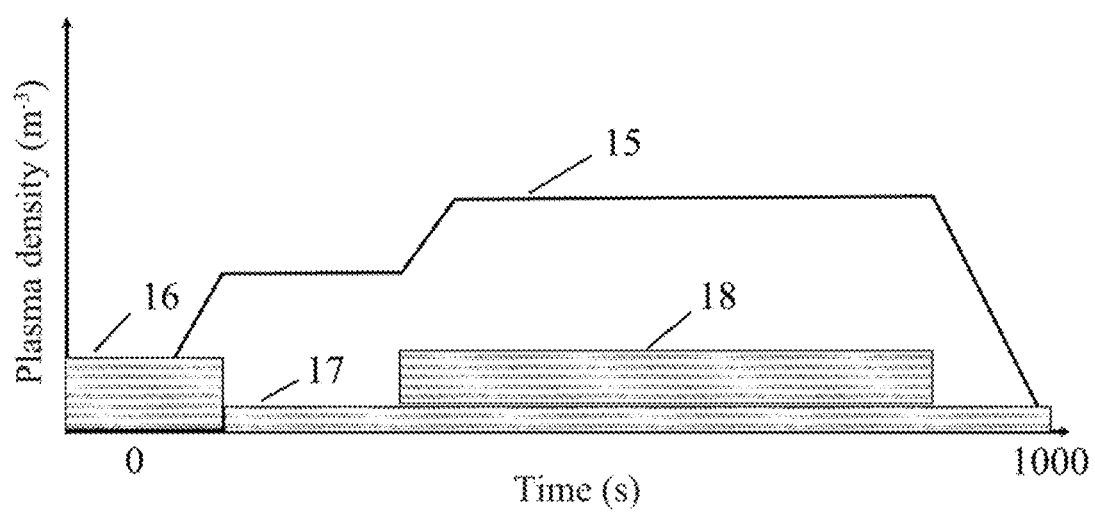
FIG. 2 is a schematic diagram of a coordinated fueling method in accordance with an embodiment of the present disclosure.

As shown in FIGS. 1-2, a coordinated fueling system satisfying thousand-second pulsed plasma discharge is provided, which includes a gas puffing system 16, a supersonic molecular beam injection system 17, an ice pellet injection system 18, a fusion device 1, a gas puffing port of a wave antenna, a divertor 13 and a plasma 14.

The gas puffing system 16 is provided with a piezoelectric valve 3 for gas flow adjustment. The supersonic molecular beam injection system 17 is provided with a Laval nozzle 6 for gas injection. The ice pellet injection system 18 is configured for pellet preparation, acceleration and propulsion. The fusion device 1 is a magnetic confinement fusion reaction device. The gas puffing port of the wave antenna is arranged near a low hybrid wave and ion cyclotron wave antenna. The divertor 13 is configured to discharge a fusion ash. The plasma 14 is electrically neutral as a whole. The divertor 13 is a key component in a vacuum chamber of the fusion device 1. The plasma 14 is operated in the fusion device 1. The divertor 13 can be strongly interacted with the plasma 14. The gas puffing system 16, the supersonic molecular beam injection system 17, the ice pellet injection system 18 and the fusion device 1 are each provided with an isolation valve 2. The isolation valve 2 is configured to control a pulse time and an injection rate of an injected gas. A pressure stabilizing tank 4 is arranged in the pipeline of the gas puffing system 16. The gas puffing system 16, the supersonic molecular beam injection system 17 and the ice pellet injection system 18 are each provided with a fuel cylinder 5, which is configured to provide fuel gas. The Laval nozzle 6, a solenoid valve 7 and a gas distribution box 8 are main components of the supersonic molecular beam injection system 17, and are arranged on a pipeline of the supersonic molecular beam injection system 17. A diffusion chamber 9, a vacuum pumping unit 10, a pellet injector 11 and a propellant gas cylinder 12 are main components of the ice pellet injection system 18, and are arranged in a pipeline of the ice pellet injection system 18.

During a thousand-second pulsed plasma discharge process of the fusion device 1, the plasma 14 is established by the gas puffing system 16 provided at a mid-plane of the fusion device 1. Parameters of the plasma 14 in a scrape-off layer near the wave antenna are adjusted by the gas puffing system 16 provided near the wave antenna thereby improving a coupling efficiency. A feedback control on a density of the plasma 14 is performed by the supersonic molecular beam injection system 17. A core fueling on the plasma 14 is performed by the ice pellet injection system 18. A feedback control of a heat flux of the divertor 13 is performed by the gas puffing system 16 provided at the divertor 13 and the supersonic molecular beam injection system 17. The coordinated fueling is achieved through coordination of different fueling methods at different positions and different moments, so as to achieve stable thousand-second density control of the fusion device 1, effective coupling of a low hybrid wave and an ion cyclotron wave and effective control of the heat flux of the divertor 13.

As shown in FIG. 2, a coordinated fueling method satisfying thousand-second pulsed plasma discharge is provided, which includes the following steps. A density 15 of a thousand-second plasma is obtained. The gas puffing is performed by the gas puffing system 16. The supersonic molecular beam injection is performed by the supersonic molecular beam injection system 17. An ice pellet injection is performed by the ice pellet injection system 18. The density 15 of the thousand-second plasma is obtained by pre-gas puffing breakdown of the gas puffing system 16 before the discharge of the plasma 14. A feedback control on a density of the plasma 14 is performed through the supersonic molecular beam injection system 17. A core fueling is performed through the ice pellet injection system 18, thereby improving a fueling efficiency and the density of the plasma and establishing a higher plasma density than the initial thousand-second plasma density. The plasma 14 is operated in the fusion device 1. The divertor 13 is a key component of an interaction between the fusion device 1 and the plasma 14. The gas puffing system 16 includes a pre-gas fueling system for plasma discharge at the mid-plane of the fusion device 1, a gas fueling system for the gas puffing port of the wave antenna, an upper gas fueling system of the divertor, a lower gas fueling system of the divertor. The upper gas fueling system and the lower gas fueling system are each mainly composed of the isolation valve 2, the piezoelectric valve 3, the pressure stabilizing tank 4 and the fuel cylinder 5. The supersonic molecular beam injection system 17 includes a first portion and a second portion. The first portion is arranged at the mid-plane of the fusion device 1. The second portion is arranged at the divertor 13. The first portion and the second portion are each mainly composed of the isolation valve 2, the fuel cylinder 5, the Laval nozzle 6, the solenoid valve 7 and the gas distribution box 8. The ice pellet injection system 18 is arranged at the mid-plane of the fusion device 1, and is composed of the isolation valve 2, the fuel cylinder 5, the diffusion chamber 9, the vacuum pumping unit 10, the pellet injector 11 and the propellant gas cylinder 12.

The gas puffing system 16 involved in the first fueling method is operated as follows. The injected gas is injected into the pressure stabilizing tank 4 from the fuel cylinder 5. A pulse time and an injection rate of the injected gas is controlled through the piezoelectric valve 3. The first injected gas enters the fusion device 1 after the isolation valve 2 is opened to complete the gas supply. Systems for realizing the gas puffing are respectively arranged at the mid-plane of the fusion device 1, near the wave antenna of the fusion device 1 and at the upper and lower divertor, so as to realize the pre-gas puffing of the plasma 14, the adjustment of boundary parameters of the plasma 14 to improve wave coupling efficiency and the control of the heat flux of the divertor 13.

The supersonic molecular beam injection system 17 involved in the second fueling method is operated as follows. The injected gas is injected into the gas distribution box 8 through the fuel cylinder 5. A pulse time and an injection frequency are regulated through the solenoid valve 7. The injected gas is accelerated through the Laval nozzle 6 to enter the plasma 14 inside the fusion device 1 through the isolation valve 2. The supersonic molecular beam injection system 17 includes a first portion and a second portion. The first portion is arranged at the mid-plane of the fusion device 1, and the second portion is arranged at the divertor 13, so as to satisfy requirements of feedback control of the plasma density and alleviation of the heat flux of the divertor 13.

The ice pellet injection system 18 involved in the third fueling method is operated as follows. The fuel gas enters the pellet injector 11 through the fuel cylinder 5, and is condensed into ice and cut to form a cylindrical ice pellet. The ice pellet is accelerated by the propellant gas cylinder 12 to enter the diffusion chamber 9. The propellant gas is pumped out of the diffusion chamber 9 through the vacuum pumping unit 10. The ice pellet enters the plasma 14 through the isolation valve 2 to achieve core fueling and establish a high-density plasma.

A top of the fusion device 1 and a bottom of the fusion device 1 are each provided with the divertor 13 as a region where particles of the plasma 14 are strongly interacted with the heat flux. An ablation of the divertor 13 may be easily caused, such that an ablated material enters the plasma 14, resulting in the degrading of the performance of the plasma 14. The gas puffing system 16 and the supersonic molecular beam injection system 17 arranged at the divertor 13 can alleviate the interaction between the plasma 14 and the divertor 13, reduce the heat flux of the divertor 13 and facilitate the maintenance of a long-pulse plasma discharge.

The coordinated fueling method at different positions and in different ways which can realize the coordinated fueling of plasma discharge has the following operating process.

The plasma is established through gas puffing. Parameters of the plasma in a scrape-off layer near the wave antenna to improve a coupling efficiency between a lower hybrid wave and an ion-cyclotron wave. After the plasma is established, the feedback control on the density of the plasma is performed through supersonic molecular beam injection. The core fueling on the plasma is performed through ice pellet injection to satisfy the requirements for plasma operation. The feedback control of the heat flux of the divertor is performed through gas puffing and supersonic molecular beam injection at the divertor. The coordination of different fueling methods can achieve stable thousand-second density control of the fusion device, boundary parameter adjustment of the plasma required for wave coupling and effective control of the heat flux of the divertor.

The embodiments mentioned above are intended to facilitate understanding of the present disclosure rather than limiting the scope of the disclosure. For those of ordinary skill in the art, various modifications made without departing from the spirit and scope of the present disclosure shall fall within the scope of the present disclosure defined by the appended claims.

What is claimed is:

1. A coordinated fueling method for establishing a thousand-second pulsed plasma discharge based on a fueling system comprising:
    a first gas puffing system, a second gas puffing system, a third gas puffing system, each gas puffing system comprising a piezoelectric valve configured to adjust a gas flow of the respective gas puffing system;
    a first supersonic molecular beam injection system, a second supersonic molecular beam injection system, each supersonic molecular beam injection system comprising a Laval nozzle; and
    a magnetic confinement fusion device comprising a low hybrid wave-ion cyclotron wave antenna having a gas puffing port, a divertor configured to discharge a fusion ash and comprising a target plate, and an electrically neutral plasma;
    the first gas puffing system being provided at a mid-plane of the fusion device, the second gas puffing system being provided at the gas puffing port of the wave antenna, the third gas puffing system being provided at the target plate;
    the first supersonic molecular beam injection system being provided at the mid-plane of the fusion device; the second supersonic molecular beam injection system being provided at the divertor;
    the coordinated fueling method comprising:
    establishing, by the first gas puffing system, the plasma by injecting a first part of gas required for plasma discharge, and adjusting, by the second gas puffing system, boundary parameters of the plasma in a scrape-off layer at the wave antenna to improve a coupling efficiency between a lower hybrid wave and an ion-cyclotron wave;
    performing, by the first supersonic molecular beam injection system, feedback control on a density of the plasma, and fueling, by the first supersonic molecular beam injection system, to maintain the plasma; and
    performing, by the third gas puffing system and the second supersonic molecular beam injection system, feedback control of a heat flux of the divertor, thereby establishing the thousand-second plasma discharge.

2. The coordinated fueling method of claim 1, wherein each of the first gas puffing system, the second gas puffing system and the third gas puffing system further comprise a fuel cylinder, a pressure stabilizing tank, and an isolation valve.

3. The coordinated fueling method of claim 1, wherein each of the first supersonic molecular beam injection system and the second supersonic molecular beam injection system further comprise a fuel cylinder, a gas distribution box, a solenoid valve, and an isolation valve.

\* \* \* \* \*